United States Patent Office 3,329,565
Patented July 4, 1967

3,329,565
PHARMACEUTICAL PREPARATION PRESERVED WITH p-CHLOROPHENYL-ETHYL-ALCOHOL
Peter Speiser, Forch, Zurich, and Hans-Kaspar Hess, Binningen, Switzerland, assignors to Ciba Corporation, New York, N.Y., a corporation of Delaware
No Drawing. Filed June 25, 1963, Ser. No. 290,319
Claims priority, application Switzerland, Sept. 25, 1958, 64,323
5 Claims. (Cl. 167—58)

This application is a continuation in part of our application Ser. No. 841,445, filed Sept. 22, 1959, and now abandoned.

This invention relates to a method for preserving and sterilizing sugar-free pharmaceutical preparations, especially sugar-free liquid pharmaceutical preparations, and to sugar-free pharmaceutical preparations containing a preserving and sterilizing agent.

It is known that water-soluble phenols of low molecular weight possess disinfecting and preserving properties. As, however, they possess an unpleasant odour and have an irritant action on the tissues they can only very seldom be used for preserving aqueous solutions of medicaments or food-stuffs. The antibacterial properties of benzyl alcohols have also been described. Thus, Gershenfeld (American Journal of Pharmacology, 1952, volume 124, page 399) has described the use of benzyl alcohol in parenteral solutions, an aqueous solution of 1% strength having exhibited a good bacteriostatic action against Staph. aureus, E. coli, Bacillus subtilis, Bacillus mesentericus and Bacillus megatherium. There is also described in French specification No. 885,966 the use of a series of phenyl-alkyl and phenyl-alkenyl alcohols and among others para-chloro-benzyl alcohol, as agents for disinfection, especially against tubercle bacilli.

The present invention is based on the observation that para-chlorophenyl-ethyl alcohol possesses especially good preserving and sterilizing properties.

Thus, an aqueous solution of 0.4% strength is completely lethal at 20° C. within a period of less than 15 minutes towards bacterial cultures containing about 3.10$^6$ bacterial cells per 10 cc. of *Escherichia coli, Pseudomonas aeruginosa, Micrococcus pyogenes* var. *aureus* and *Coryne-bacterium diphtheriae*. The same results have been observed in a period of 30 minutes to 6 hours with a solution of 0.3% strength. A solution of 0.2% strength sterilizes suspensions of *Escherichia coli* and *Pseudomonas aeruginosa* in the course of 24 hours and reduces the number of living cells of *Staph. aureus* by 99.99%.

These results and those of analogous tests with known disinfecting and preserving agents are set out in the following table, in which the lethal action is expressed as the percentage reduction of living cells calculated on the number of bacteria originally present.

The preserving and sterilizing agent of this invention is in aqueous solution electrically neutral and does not dissociate. It has extremely little toxicity and is colorless and odorless.

It is an object of this invention to provide a method for preserving and sterilizing sugar-free pharmaceutical preparations by adding to said preparation the said p-chloro-phenyl-ethyl alcohol. A further object is to add the p-chloro-phenyl-ethyl alcohol to liquid, especially to aqueous sugar-free pharmaceutical preparations. The said sterilizing and preserving alcohol is especially suitable for maintaining sterile sugar-free injection solutions, drops for the eyes, ears or nose, jellies and lotions, for example for cutaneous application.

A further advantage of using para-chlorophenyl ethyl alcohol as a sterilizing agent is, for example, that injection solutions, to which 0.3 to 0.4% of that compound has been added, need not be sterilized in an autoclave at 120° C., and that short heating in a current of steam suffices to kill spores. Thus, even thermolabile injection solutions that cannot be sterilized by heat in an autoclave can be maintained free from germs in a simple manner. Furthermore, the high bactericidal action of the compound of this invention enables it to be used in concentrations of only 0.2% strength, when a rapid bactericidal action is not essential.

A still further object of this invention is to provide new sugar-free pharmaceutical preparations containing para-chloro-phenyl-ethyl alcohol in an amount of about 0.4 to 0.2% as preserving and sterilizing agent, together with a pharmaceutically active substance and a pharmaceutical carrier. These preparations are preferably in liquid form, the carrier being a pharmaceutically acceptable solvent or solvent mixture, such as primarily water.

Liquid para-chlorophenyl-ethyl alcohol is known and can be obtained, for example, in the manner described in Journ. Sci. Food Agr., vol. 2, 1951, page 94, and can be purified by way of its succinic acid semi-ester to remove any traces of water-insoluble impurities that may be present.

The following examples illustrate the invention:

VACCINES AND SERA

Example 1

0.3% of para-chlorophenyl-ethyl alcohol is dissolved in physiological sodium chloride solution by shaking or stirring and, if desired, with slight warming, and there is added the necessary quantity of Antigenum diphthericum praeciptitatum seu adsorptum Ph. H.V. The vaccine solution so obtained can be charged into ampoules in the usual manner.

| Substance | Concentration, percent | Temp.,° | Period of action | Lethal action on— | |
|---|---|---|---|---|---|
| | | | | E. coli | Staph. aureus |
| p-Chlorophenyl ethyl alcohol | 0.4 | 20 | <15 min | Sterile (99.9999%) | Sterile (99.9999%). |
| | 0.3 | 20 | 30 min | do | |
| | | 37 | 30 min | | Sterile (99.9999%). |
| | 0.2 | 20 | 24 hours | Sterile (99.9999%) | 99.99%. |
| | | 37 | 2 hours | do | 99.99%. |
| Phenol | 1 | 20 | 30 min | 99.99% | <99.9%. |
| | 0.5 | 20 | 24 hours | 99.99% | <99.9%. |
| Benzyl alcohol | 1 | 20 | 2 hours | Slight | |
| | 1 | 20 | 24 hours | | About 99%. |
| | 1 | 20 | 2 hours | 99.99% | <99.9%. |
| β-Phenyl ethyl alcohol | 1 | 20 | 24 hours | Sterile (99.9999%) | Sterile (99.999%). |
| | 0.5 | 20 | do | <99.9% | <99.9%. |
| para-Chlorobenzyl alcohol | 0.3 | 20 | do | Sterile (99.9999%) | 99.99%. |

In an analogous manner the whooping cough vaccine (Antigenum pertussicum Ph. H.V.), tetanus vaccine (Antigenum tetanicum praeciptitatum seu adsorptum Ph. H.V.), poliomyelitis vaccine and Serum antidiphthericum Ph. H.V. can be preserved.

INJECTION SOLUTIONS

Example 2

| | Grams |
|---|---|
| Ascorbic acid | 11 |
| Sodium chloride | 5 |
| Para-chlorophenyl-ethyl alcohol | 0.3 |
| Distilled water to make 100 cc. | |

The freshly distilled water was heated to the boil for 10 minutes and the para-chlorophenyl-ethyl alcohol was dissolved in the hot solution. The whole was allowed to cool while passing in carbon dioxide, the ascorbic acid and sodium chloride were dissolved in 80–90 cc. of the resulting water, and after complete dissolution the sodium bicarbonate was gradually added. When the evolution of gas ceased and after complete dissolution of the bicarbonate, the whole was made up to exactly 100 cc. with water which had been prepared in the manner described above. The solution was immediately filtered through a glass suction filter, charged into ampoules in an atmosphere of carbon dioxide, and sterilized by heating it in a free current of steam for 30 minutes.

In a corresponding manner morphine solutions of 1, 2 or 3% strength can be prepared.

Example 3

| | | |
|---|---|---|
| Amylocaine hydrochloride | grams | 1.0 |
| Sodium chloride | do | 0.65 |
| $\frac{1}{10}$ N hydrochloric acid | cc | 0.8 |
| Para-chlorophenyl-ethyl alcohol | grams | 0.4 |
| Distilled water to make 100 cc. | | |

The para-chlorophenyl-ethyl alcohol was dissolved in freshly distilled warm water by stirring or shaking and, after cooling the solution, the sodium chloride and amylocaine were added. The whole was acidified with hydrochloric acid, then made up with distilled water to 100 cc., and the solution was charged into ampoules. The ampoules were sterilized for 30 minutes in free flowing steam.

Example 4

Para-chlorophenyl-ethyl alcohol was dissolved in water to give a concentration of 0.4% with a small amount of methyl-cellulose and the quantity of sodium chloride (0.75%) required to give isotonicity and a small amount of hydrous sodium phosphate (0.3%) with powerful stirring. The whole was sterilized at 120° C. for 20 minutes, microcrystals of desoxycorticosterone acetate were suspended therein under aseptic conditions, with the addition of a small amount of a wetting agent, such as Tween 20 or Tween 60, and charged into ampoules.

Crystal ampoules of corresponding steroid hormones can be prepared by using testosterone isobutyrate, oestradiol monobenzoate or progesterone, instead of desoxycorticosterone acetate.

LOTIONS

Example 5

| | | |
|---|---|---|
| Calamine | g | 15.0 |
| Zinc oxide | g | 5.0 |
| Bentonite | g | 3.0 |
| Sodium citrate | cc | 5 |
| Glycerine | cc | 5 |
| Para-chlorophenyl-ethyl alcohol | g | 0.3 |
| Distilled water ad 100 cc. | | |

A solution of the sodium citrate and para-chlorophenyl-ethyl alcohol is prepared with vigorous stirring or agitation, in about 70 cc. of water, and the calamine, zinc oxide and bentonite are triturated with the solution. The glycerine is added, and the whole is made up to 100 cc. with water.

EYE DROPS

Example 6

2 cc. of para-chlorophenyl-ethyl alcohol are dissolved, while warming and shaking well, in 1 liter of sterile water or 1 liter of sterile isotonic sodium chloride solution which may be buffered in the usual manner. 20 grams of atropine sulfate or 13 grams of ephedrine hydrochloride or 30 grams of pilocarpine hydrochloride or 1 gram of zinc sulfate are introduced under aseptic conditions into a measuring flask of 1 liter capacity and the whole is made up to the 1 liter mark with the solution prepared as described above. Solutions so obtained are charged into sterile eye dropping bottles.

What is claimed is:

1. An injectable pharmaceutical preparation containing para-chlorophenyl-ethyl alcohol in an amount of about 0.4 to 0.2% as preserving and sterilizing agent, a pharmaceutically active substance and an injectable pharmaceutical carrier, said preparation being sugar-free.

2. An injectable liquid pharmaceutical preparation containing para-chlorophenyl-ethyl alcohol in an amount of about 0.4 to 0.2% as preserving and sterilizing agent, a pharmaceutically active substance and a liquid injectable pharmaceutical carrier, said preparation being sugar-free.

3. An injectable pharmaceutical preparation containing para-chlorophenyl-ethyl alcohol in an amount of about 0.4 to 0.2% as preserving and sterilizing agent, a pharmaceutically active substance and water as a liquid injectable pharmaceutical carrier, said preparation being sugar-free.

4. An ophthalmic liquid pharmaceutical preparation containing para-chlorophenyl-ethyl alcohol in an amount of about 0.4 to 0.2% as preserving and sterilizing agent, a pharmaceutically active substance and a liquid ophthalmic pharmaceutical carrier, said preparation being sugar-free.

5. An ophthalmic aqueous pharmaceutical preparation containing para-chlorophenyl-ethyl alcohol in an amount of about 0.4 to 0.2% as preserving and sterilizing agent, a pharmaceutically active substance and water as a liquid ophthalmic pharmaceutical carrier, said preparation being sugar-free.

References Cited

UNITED STATES PATENTS 2,850,410   9/1958   Manly _____ 167—93 X

ALBERT T. MEYERS, *Primary Examiner.*

SAM ROSEN, JULIAN S. LEVITT, *Examiners.*